United States Patent
Jung et al.

(10) Patent No.: US 9,574,948 B2
(45) Date of Patent: Feb. 21, 2017

(54) TEMPERATURE SENSOR AND TEMPERATURE SENSING METHOD

(71) Applicant: Industry-Academic Cooperation Foundation, Yonsei University, Seoul (KR)

(72) Inventors: Seong-Ook Jung, Seoul (KR); Kyungho Ryu, Seoul (KR); Dong-Hun Jung, Seoul (KR); Young-Jae An, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 409 days.

(21) Appl. No.: 14/158,119

(22) Filed: Jan. 17, 2014

(65) Prior Publication Data
US 2014/0204974 A1    Jul. 24, 2014

(30) Foreign Application Priority Data

Jan. 18, 2013 (KR) .......................... 10-2013-0006034

(51) Int. Cl.
*G01K 1/12*    (2006.01)
*G01K 7/32*    (2006.01)
*G01K 7/34*    (2006.01)

(52) U.S. Cl.
CPC ................. *G01K 7/32* (2013.01); *G01K 7/346* (2013.01)

(58) Field of Classification Search
CPC .......................................... G01K 1/12
USPC ........................................ 374/170
See application file for complete search history.

(56) References Cited

U.S. PATENT DOCUMENTS

| | | | | |
|---|---|---|---|---|
| 7,126,396 B1* | 10/2006 | Courcy | ................ | H03K 5/1515 327/166 |
| 7,902,893 B1* | 3/2011 | Jansson | ................ | H03K 5/1565 327/172 |
| 8,351,284 B2* | 1/2013 | Kim | .................... | G11C 7/22 365/194 |
| 8,373,482 B2 | 2/2013 | Sabapathy et al. | | |
| 9,035,684 B2* | 5/2015 | Jung | ...................... | H03L 7/0802 327/149 |
| 2002/0125926 A1* | 9/2002 | Schnell | ................ | G11C 7/1066 327/156 |
| 2006/0214710 A1* | 9/2006 | Gomm | ................ | G11C 7/1066 327/158 |

(Continued)

FOREIGN PATENT DOCUMENTS

| CN | 1254990 A | 5/2000 |
|---|---|---|
| CN | 1941170 A | 4/2007 |

(Continued)

*Primary Examiner* — Lisa Caputo
*Assistant Examiner* — Jamel Williams
(74) *Attorney, Agent, or Firm* — Harness, Dickey & Pierce, P.L.C.

(57) ABSTRACT

Provided is a temperature sensing circuit and a temperature sensing method including a delay unit delaying an input clock signal to generate a feedback clock signal, and including logic gates of which delay times are variable according to temperature, a delay control unit comparing the feedback clock signal with a reference clock signal and controlling each of the logic gates of the delay unit according to the comparison result, and an input signal control unit selecting, as the input clock signal, any one of the feedback clock signal and the reference clock signal to input the input clock signal to the delay unit.

18 Claims, 10 Drawing Sheets

(56) References Cited

U.S. PATENT DOCUMENTS

| | | | |
|---|---|---|---|
| 2007/0176661 A1* | 8/2007 | Shin | H03K 3/0315 |
| | | | 318/268 |
| 2008/0232180 A1* | 9/2008 | Kim | G11C 7/1051 |
| | | | 365/194 |
| 2008/0246516 A1 | 10/2008 | Hoang et al. | |
| 2008/0252340 A1* | 10/2008 | Yeo | H03L 7/0814 |
| | | | 327/156 |
| 2011/0234280 A1* | 9/2011 | Na | H03L 7/0816 |
| | | | 327/158 |
| 2012/0182054 A1 | 7/2012 | Sabapathy et al. | |
| 2014/0002150 A1* | 1/2014 | Seo | H03L 7/0812 |
| | | | 327/156 |
| 2014/0062552 A1* | 3/2014 | Choi | H03L 7/08 |
| | | | 327/158 |

FOREIGN PATENT DOCUMENTS

| | | | | |
|---|---|---|---|---|
| JP | H0612889 A | | 1/1994 | |
| KR | 10-1043997 B1 | | 6/2011 | |
| KR | 10-1173978 B1 | | 12/2011 | |
| KR | 20120047378 A | * | 5/2012 | |
| KR | 10-1202741 B1 | | 11/2012 | |
| KR | 101418045 B1 | * | 7/2014 | G01K 7/32 |

* cited by examiner

TEMPERATURE SENSOR AND TEMPERATURE SENSING METHOD

CROSS-REFERENCE TO RELATED APPLICATIONS

This U.S. non-provisional patent application claims priority under 35 U.S.C. §119 of Korean Patent Application No. 10-2013-0006034 filed on Jan. 18, 2013, the entire contents of which are hereby incorporated by reference.

BACKGROUND OF THE INVENTION

The present invention disclosed herein relates to a temperature sensing circuit, and more particularly to a digital temperature sensor and a temperature sensing method.

The existing temperature sensing circuits have been mainly designed on the basis of an analog circuit. The analog temperature sensing circuits have limitations of a large size and large power consumption. Accordingly, nowadays, a digital type temperature sensing circuit has been researched. As an example, Korean Patent No. 1173978 discloses "Temperature sensing circuit and operating method thereof". This kind of digital temperature sensing circuit may have a temperature measurement error, as an output clock signal thereof is continuously circulated in a ring oscillator, which results accumulation of noises, such as quantization errors or jitters.

SUMMARY OF THE INVENTION

The present invention provides a temperature sensing circuit and a temperature sensing method having a small and/or without temperature measurement error.

The present invention also provides a temperature sensing circuit and a temperature sensing method capable of preventing noises, such as quantization errors or jitters, from being accumulated.

The present invention also provides a temperature sensing circuit having low power consumption.

The objectives of the present invention are limited thereto. The objectives not mentioned in the above should be clearly understood by those skilled in the art from description below.

Embodiments of the present invention provide temperature sensing circuits including: a delay unit delaying an input clock signal to generate a feedback clock signal, and including logic gates of which delay times are variable according to temperature; a delay control unit comparing the feedback clock signal with a reference clock signal and controlling each of the logic gates of the delay unit according to the comparison result; and an input signal control unit selecting, as the input clock signal, any one of the feedback clock signal and the reference clock signal to input the input clock signal to the delay unit, based on the number of circulation cycles of the input clock signal.

In some embodiments, the input signal control unit may input the feedback clock signal to the delay unit only while the input clock signal circulates as many as a predetermined number of cycles, and input the reference clock signal to the delay unit after the input clock signal circulates as many as the predetermined number of cycles.

In other embodiments, after receiving rising edges of the reference clock signal, the input signal control unit may input the feedback clock signal to the delay unit.

In still other embodiments, the delay control unit may control each of the logic gates every time the input clock signal circulates as many as the predetermined number of cycles.

In even other embodiments, the delay control unit may control the delay unit so that N cycles (where N is an integer of 2 or greater) of the input clock signal are synchronized with one cycle of the reference clock signal.

In yet other embodiments, the input signal control unit may include: a selection signal generating unit generating a selection control signal according to the number of circulation cycles of the input clock signal; and a multiplexer selecting, as the input clock signal, any one of the feedback clock signal and the reference clock signal according to the selection control signal and inputting the input clock signal to the delay unit.

In further embodiments, the selection signal generating unit may include: a counter counting pulses of the feedback clock signal; and a comparator comparing the count result of the counter and a reference value and generating the selection control signal according to the comparison result.

In still further embodiments, the comparator may reset the counter to have an initial value after the input clock signal circulates as many as the predetermined number of cycles, and the counter may count the pulses of the feedback clock signal from when the feedback clock signal is input to the delay unit in correspondence to rising edges of the reference clock signal.

In even further embodiments, the temperature sensing circuit may further include a clock gate clock-gating an external clock signal to generate the reference clock signal.

In yet further embodiments, after one cycle of the reference clock signal is synchronized with N cycles of the input clock signal, the clock gate may output a low level signal as the reference clock signal for a predetermined clock cycle period of the external clock signal.

In much further embodiment, the temperature sensing circuit may further include a temperature calculating unit calculating temperature on the basis of a control code for each of the logic gates controlled by the delay control unit.

In other embodiments of the inventive concept, temperature sensing methods include: inputting, as an input clock signal, a reference clock signal to a delay unit and delaying the reference clock signal to generate a feedback clock signal, and circulating the feedback clock signal to the delay unit only while the input clock signal circulates as many as N cycles (where N is an integer of 2 or greater); and after the input clock signal circulates as many as N cycles, inputting the reference clock signal to the delay unit and adjusting a delay time of the delay unit to allow N cycles of the input clock signal to be synchronized with one cycle of the reference clock signal.

In some embodiment, the adjusting of the delay time may include inputting the reference clock signal to the delay unit from when the input clock signal circulates as many as N cycles to when rising edges of the reference clock signal are input.

In other embodiment, the adjusting of the delay time may include adjusting the delay time every time the input clock signal circulates as many as the number of N cycles.

In still other embodiments, the temperature sensing method may further comprise: clock-gating an external clock signal to generate the reference clock signal; and outputting, as the reference clock signal, a low level signal for a predetermined clock cycle period of the external clock signal, after one cycle of the reference clock signal is synchronized with N cycles of the input clock signal.

In even other embodiments, the adjusting of the delay time may include comparing N cycles of the input clock signal with one cycle of the reference clock signal, calculating one-bit information for a delay control code, which controls logic gates of the delay unit at every (2 k−1)-th (where k=1, 2, . . . , K) cycle of the external clock signal according to the comparison result, and determining a K-bit delay control code for adjusting the delay time of the delay unit for 2K−1 cycles of the external clock signal.

In yet other embodiments, the adjusting of the delay time may include inputting, as the input clock signal, a low level signal at a 2 m-th (where m=1, 2, . . . , K−1) cycle of the external clock signal for determining the delay control code at the (2 k−1)-th (where k=1, 2, . . . , K) cycle of the external clock signal.

In further embodiments, the temperature sensing method may further include calculating temperature on the basis of the K-bit delay control code.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when a component is referred to as being 'connected to' or 'coupled to' or the like, it can be directly connected to or coupled to another component or intervening component may be present. Descriptions of well-known components and processing techniques of a temperature sensing circuit are omitted so as to not unnecessarily obscure the embodiments herein.

A temperature sensing circuit according to an embodiment of the present invention selectively inputs a feedback clock signal fed back to a delay unit or a reference clock signal according to the number of cycles that an input clock circulates in a ring oscillator. Since a reference clock signal may be input whenever an input clock signal circulates in the ring oscillator as many as the predetermined number of cycles and the ring oscillator may be reset at every cycle of the reference clock signal, a temperature measurement error may be reduced which occurs as quantization errors or jitter noises are accumulated while the input clock signal circulates for a long time in the ring oscillator.

Figure 1:
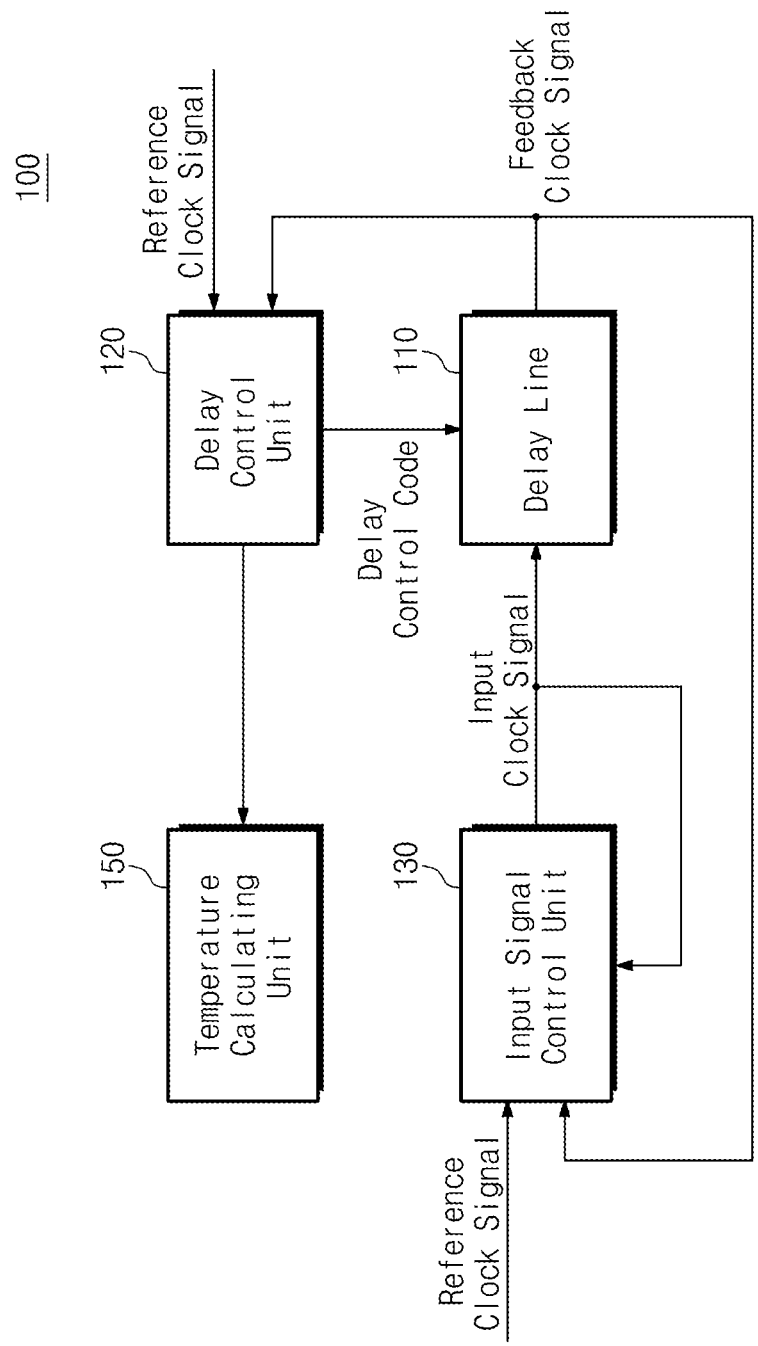
FIG. 1 is a configuration diagram illustrating a temperature sensing circuit according to an embodiment of the present invention.

FIG. 1 is a configuration diagram illustrating a temperature sensing circuit according to an embodiment of the present invention. Referring to FIG. 1, the temperature sensing circuit 100 according to the embodiment of the present invention includes a delay unit 110, a delay control unit 120, an input signal control unit 130, and a temperature calculating unit 150.

The delay unit 110 delays an input clock signal to output a feedback clock signal. The delay unit 110 includes delay cells of which delay times are variable according to temperature. A delay time of the delay unit 110 may appear as a sum of the delay times of the delay cells (logic gates). The input signal control unit 130 select one of the reference clock signal and the feedback clock signal as the input clock signal. When the feedback clock signal is selected as the input clock signal, the temperature sensing circuit 100 operates as a ring oscillator.

The delay control unit 120 adjusts the delay time by controlling each logic gate of the delay unit 110. When the delay time of the delay unit 110 becomes reduced, the number of cycles that the feedback clock signal circulates in the ring oscillator for one period of the reference clock signal is increased and accordingly a frequency of the feedback clock signal (an output clock signal from the ring oscillator) will be increased. When the delay time of the delay unit 110 is increased, the frequency of the feedback clock signal will be decreased.

The delay control unit 120 compares a phase at N cycles of the feedback clock signal with a phase of one cycle of the reference clock signal, and controls each logic gate of the delay unit 110 according to the comparison result. The delay control unit 120 may check a phase at every N cycles of the feedback clock signal at every rising edge of the reference clock signal to control the delay time of the delay unit 110. A single delay cell (a logic gate) of the delay unit 110 may delay a signal by a delay time of, for example, a complementary metal-oxide-semiconductor (CMOS) gate as Equation (1).

$$D = \frac{L}{W} \cdot \frac{C_L}{C_{OX}} \cdot \frac{1}{\mu} \cdot \frac{\ln(3 - 4V_{th}/V_{DD})}{V_{DD}(1 - V_{th}/V_{DD})} \quad (1)$$

where D denotes the delay time of the CMOS gate, L denotes the length of the CMOS gate, W denotes the width of the CMOS gate, $C_1/C_{OX}$ denotes a capacity ratio of CMOS gate, $V_{DD}$ denotes an operation voltage, $V_{th}$ denotes a threshold voltage of the CMOS gate, and μ denotes mobility of the CMOS gate.

The mobility μ of the CMOS gate is proportional to a temperature constant $T^{-a}$. Here, T denotes temperature, a denotes a constant determined by a manufacturing process of a metal-oxide-semiconductor field-effect transistor (MOSFET). Accordingly, the delay time of the delay cell may be expressed as Equation (2).

$$D(T,P) = T^a \times G(P) \quad (2)$$

where D(T, P) denotes the delay time of the delay cell, and G(P) denotes a constant affected by process variation.

Accordingly, the delay time $D_{DL}(T, P)$ of the delay unit 110 may be expressed as Equation (3).

$$D_{DL}(T,P) = T^a \times n \times G(P) \quad (3)$$

where N denotes the number of the delay cells of the delay unit 110.

When maintaining the delay time of the delay unit 110 constant, the delay control unit 120 may sense temperature on the basis of the number n of the delay cells. When the process variation is removed, the delay time of the delay unit 110 may be expressed as Equation (4).

$$D_{DL,C}(T,P) = T_C^a \times N_C \times G(P) \quad (4)$$

where $T_C$ denotes reference temperature in removing of process variation, and $N_C$ denotes the number of adjusted delay cells of the delay unit 110 after removing the process variation.

When the temperature varies, the delay time $D_{DL,C}$ accordingly varies. At this time, if the number n of the delay cells is adjusted to allow the delay time to be the same as $D_{DL}$ (T,P) before the temperature varies, the temperature may be obtained and the delay time may be expressed as Equation (5).

$$D_{DL,0}(T,P) = T_0^a \times N_0 \times G(P) \quad (5)$$

where $T_0$ denotes varied temperature, and $N_0$ denotes the number of the delay cells of the delay unit 110 allowing $D_{DL,0}$ to be the same as $D_{DL,C}$.

In order to obtain the varied temperature, Equation (6) may be obtained by using $D_{DL,0}$ and $D_{DL,C}$, and accordingly the varied temperature $T_0$ may be obtained.

$$T_0 = T_C \left(\frac{N_0}{N_C}\right)^a \quad (6)$$

The number $N_0$ of the delay cells may be known from delay control code information which is generated by the delay control unit 120 in order to maintain the delay time of the delay unit 110 constant.

The delay control unit 120 controls each logic gate of the delay unit 110 whenever an input clock signal circulates as many as the predetermined number N of cycles in a ring oscillator. Since the temperature sensing circuit 100 according to an embodiment of the present invention operates to allow N cycles of the input clock signal to be synchronized with one cycle of the reference clock signal, the delay control unit 120 may be said to control the delay time of the delay unit 110 by generating a delay control signal at every cycle of the reference clock signal, namely, every time a rising edge of the reference clock signal is input.

The input signal control unit 130 selectively inputs a feedback clock signal or the reference clock signal to the delay unit 110 according to the number N of the circulating cycles of the input clock signal. The input signal control unit 130 inputs the feedback clock signal only while the input clock signal circulates as many as the predetermined number N of the cycles in the ring oscillator.

The input signal control unit 130 may input, to the delay unit 110, the reference clock signal from the time when the input clock signal circulates as many as the predetermined number of N until the time when a rising edge of the reference clock signal is input. The input signal control unit 130 may input, to the delay unit 110, the feedback clock signal from the time when the rising edge of the reference clock signal until the time when the input clock signal circulates as many as the number of cycles N.

That is, the input signal control unit 130 inputs the feedback clock signal to the delay unit 110 while the input clock signal circulates as many as the predetermined number of cycles, and inputs the input clock signal to the delay unit 110 after the input clock signal circulates as many as the predetermined number of cycles. Accordingly, since the ring oscillator is reset at every N cycles of the input clock signal, a temperature measurement error due to accumulation of measurement errors may be reduced. That is, since the circulation operation in the ring oscillator is newly started every time a rising edge of the reference clock signal is input, the delay unit 110 is not affected by a jitter noise included in a previous input clock signal (or the feedback clock signal) and occurrence of a quantization error may be prevented when the number N of the circulation cycles is set as a relatively small value (for example, 5 cycle circulation).

The delay control unit 120 generates a delay control code to adjust the delay time of the delay unit 110. The delay control unit 120 generates the delay control code to allow the delay time of the delay unit 110 to be adjusted according to temperature variation. Depending on the delay control code, the number n of the delay cells is adjusted and accordingly, a frequency of an output clock signal (the feedback clock signal) of the ring oscillator is adjusted.

When N cycles of the input clock signal appear larger than one cycle of the reference clock signal, the delay control unit 120 decreases the number of delay cells of the delay unit 110 to reduce the delay time. On the contrary, when the N cycles of the input clock signal appear smaller than one cycle of the reference clock signal, the delay control unit 120 increases the number of the delay cells to increase the delay time. When the temperature sensing circuit 100 operates as the ring oscillator, the feedback clock signal is input to the delay unit 110 as the input clock signal. Therefore, it may be said that the delay control unit 120 compares the number N of cycles of the feedback clock signal with one cycle of the reference clock signal and thereby controls the delay unit 110.

The temperature calculating unit 150 calculates temperature on the basis of the delay control code corresponding to the number of delay cells of the delay unit 110. At this time, the temperature calculating unit 150 calculates temperature on the basis of the delay control code of the delay control unit 120 when N cycles of the input clock signal are synchronized with one cycle of the reference clock signal.

Figure 2:
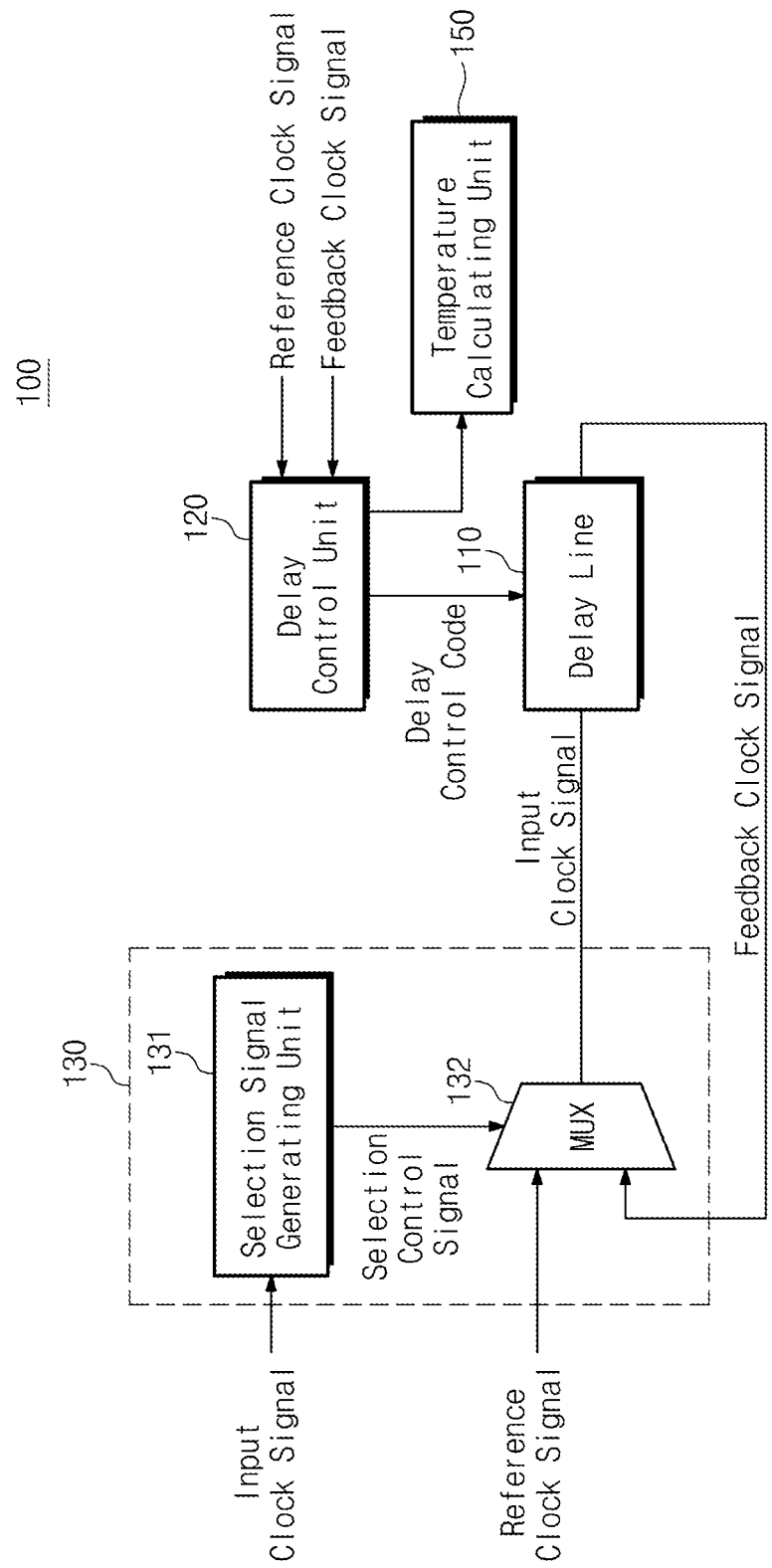
FIG. 2 is a detailed configuration diagram illustrating the temperature sensing circuit of FIG. 1.

FIG. 2 is a detailed configuration diagram illustrating the temperature sensing circuit of FIG. 1. Referring to FIGS. 1 and 2, the input signal control unit 130 includes a selection signal generating unit 131 and a multiplexer 132. The input signal control unit 130 selects, as an input clock signal to be input to the delay unit 110, any one of feedback clock signal and the reference clock signal through the multiplexer 132. The selection signal generating unit 131 generates a selection control signal according to the number of circulation cycles of the input clock signal. The multiplexer 132 selects, as the input clock signal to the delay unit 110, any one of the feedback clock signal and the reference clock signal according to the selection control signal.

Figure 3:
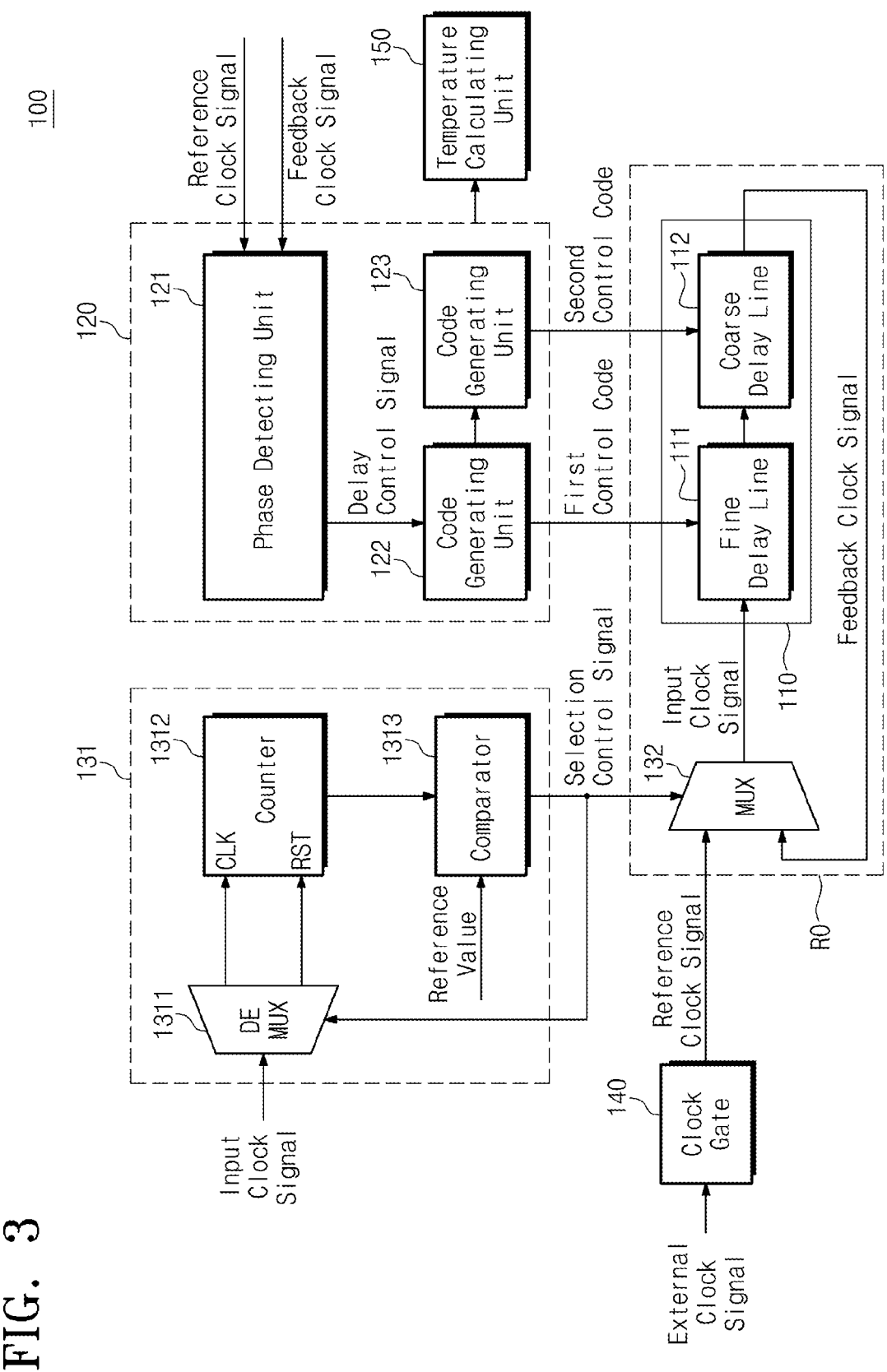
FIG. 3 is a detailed configuration diagram illustrating the temperature sensing circuit of FIG. 2.

FIG. 3 is a detailed configuration diagram illustrating the temperature sensing circuit of FIG. 2. Referring to FIGS. 1 to 3, the selection signal generating unit 131 includes a demultiplexer 1311 allowing the input clock signal to be counted or a counter 1312 to be reset according to the selection control signal, the counter 1312 counting pulses of the feedback clock signal from when the feedback clock signal is input to the delay unit 110, and a comparator 1313 comparing the counted result with a reference value to generate the selection control signal according to the comparison result.

When the input clock signal is circulated as many as the predetermined number N of circulation cycles in the ring oscillator RO, the comparator 1313 inputs the selection control signal selecting the reference clock signal to the multiplexer 132 and resets the counter 1311 as an initial value, namely, '0'. Accordingly, the reference clock signal is input to the delay unit 110 as the input clock signal. The comparator 1313 may input, to the multiplexer 132, the selection control signal for selecting the feedback clock signal in correspondence to the rising edge of the reference clock signal. Accordingly, the feedback clock signal may be input as the input clock signal to the delay unit 110 from an input time of a rising edge of the reference clock signal until the time when the input clock signal is circulated as many as the number N of cycles, and the reference clock signal may be input to the delay unit 110 after the input clock signal circulates as many as the number N of the cycles and before a rising edge of the reference clock signal is input.

A clock gate 140 generates the reference clock signal by clock-gating an external clock signal. The clock gate 140 applies the reference clock signal to the input signal control unit 130. When one cycle of the reference clock signal is synchronized with N cycles of the input clock signal, the clock gate 140 outputs a low level signal as the reference clock signal for predetermined clock cycle periods of the external clock signal in order to minimize power consumption.

For example, when temperature is measured at every 256 cycles of the external clock signal and a delay control code is calculated for 21 cycles of the external clock signal by the delay control unit 120, the clock gate 140 may output a low level signal for the rest 235 cycles of the external clock signal. Accordingly, the temperature sensing circuit 100 does not operate as the ring oscillator and power consumption for 235 cycles of the external clock signal can be reduced.

The input signal control unit 130 may control the delay unit 110 for 2K−1 cycles of the external clock signal corresponding to the number K of control bits of the delay unit 110. The number K of the control bits of the delay unit 110 may mean the entire number of the used logic gates (delay cells). The input signal control unit 130 may sequentially calculate 1-bit information for the delay control code at every 2 k−1 (where k=1, 2, . . . , K) cycles of the external clock signal to determine the delay control code of K bits to adjust the delay time of the delay unit 110 for 2K−1 cycles of the external clock signal.

At this time, in order to determine the delay control code in a (2 k−1)-th cycle of the external clock signal, the clock gate 140 may input a low level signal as the input clock signal at a 2 m (where m=1, 2, . . . K)-th cycle of the external clock signal. Accordingly, even when the N cycles of the input clock signal appears larger than one cycle of the reference clock signal, malfunction of the temperature sensing circuit 100 does not occur. The temperature calculating unit 150 may sense temperature on the basis of the delay control code at a (2K−1)-th cycle of the external clock signal. When the K bit delay control code is generated, the clock gate 140 performs clock-gating to output the reference clock signal having a low level signal until when new temperature measurement begins according to a clock-gating control signal from the delay control unit 120.

In an embodiment, the delay unit 110 includes a fine delay unit 111 and a coarse delay unit 112. The fine delay unit 111 may be designed to cover delay steps of the coarse delay unit 112. The fine and coarse delay units 111 and 112 will be described in detail later in relation to FIGS. 4 and 5.

The delay control unit 120 includes a phase detecting unit 121, a code generating unit 122, and a code converting unit 123. The phase detecting unit 121 compares the reference clock signal and N cycles of the feedback clock signal to generate any one of up, down, and lock delay control signals according to the comparison result. The code generating unit 122 generates a K bit delay control code according to the delay control signal. L bits of the K bit delay control code are a first control code for adjusting a delay time of the fine delay unit 111 and (K-L) bits are a second code for adjusting a delay time of the coarse delay unit 112. The code converting unit 123 converts the second control code into a sequential thermometer code.

Figure 4:
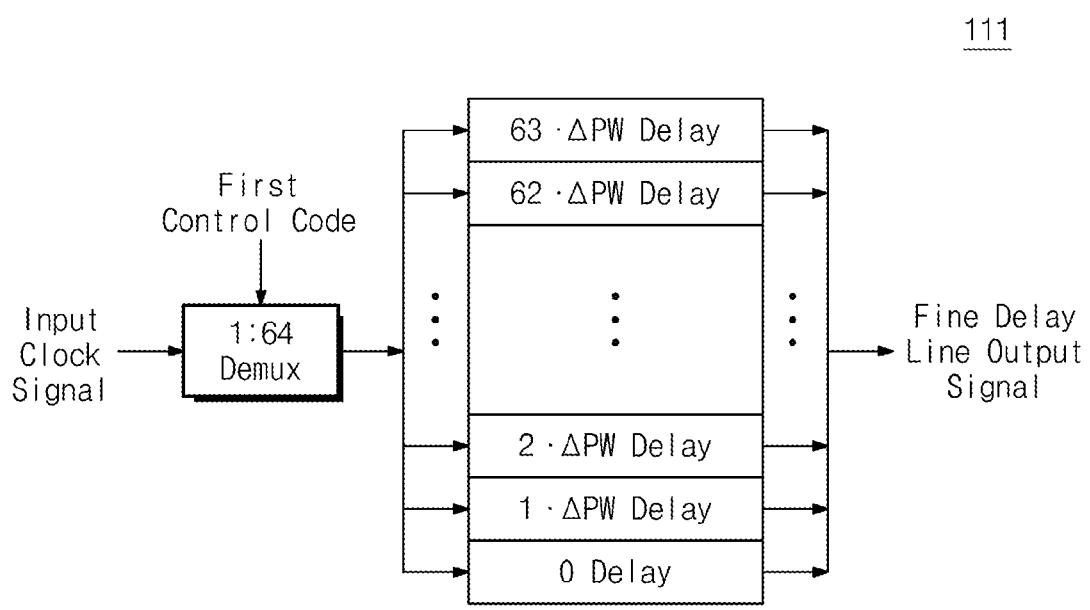
FIG. 4 illustrates a fine delay unit forming a temperature sensing circuit according to an embodiment of the present invention.
Figure 5:
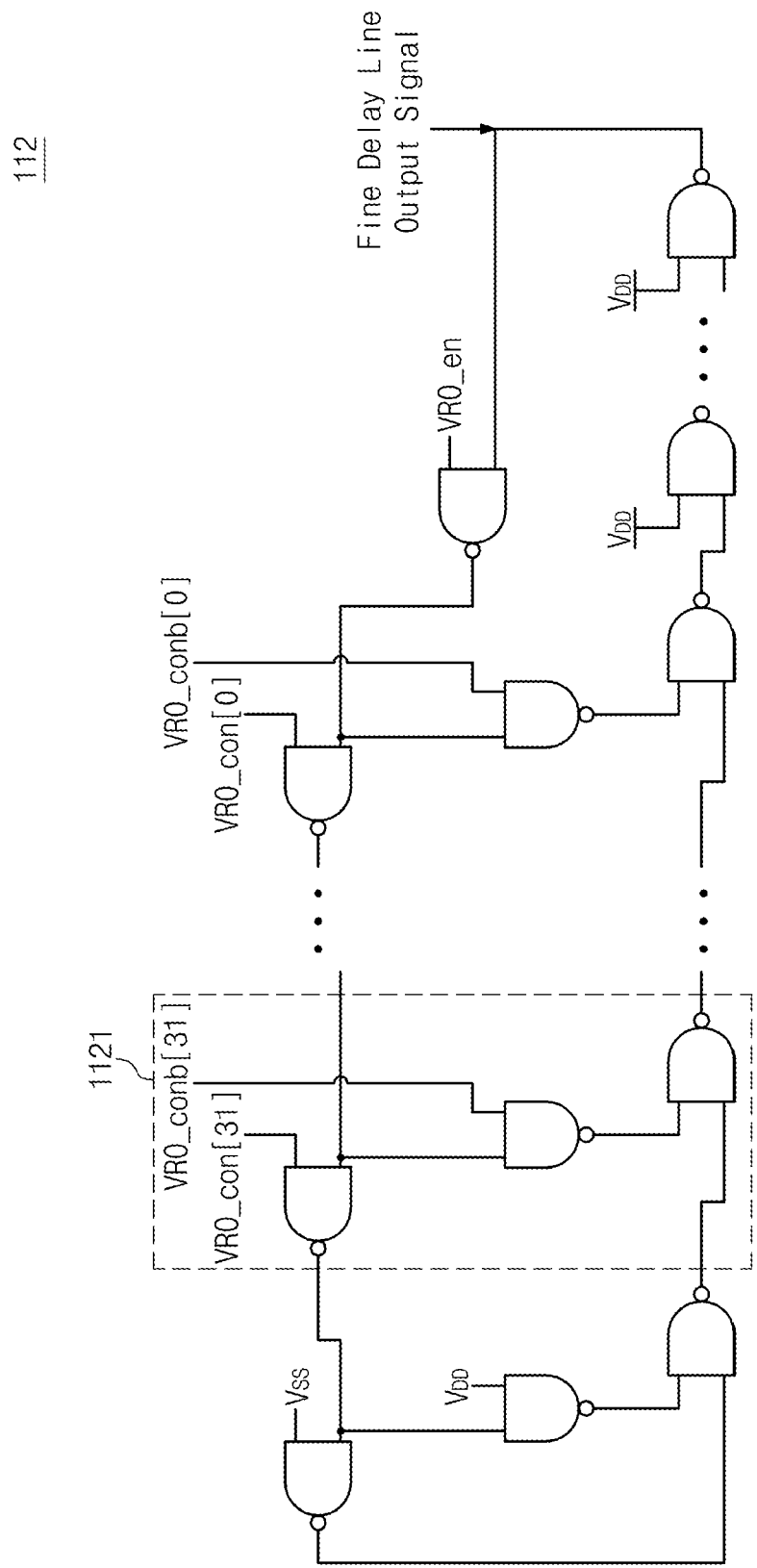
FIG. 5 illustrates a coarse delay unit forming a temperature sensing circuit according to an embodiment of the present invention.

FIG. 4 is a configuration diagram illustrating the fine delay unit forming the temperature sensing circuit according to an embodiment of the present invention, and FIG. 5 is a configuration diagram of the coarse delay unit forming the temperature sensing circuit according to an embodiment of the present invention. In the embodiments of FIGS. 4 and 5, the delay control code is realized with 11 bits. The fine delay unit 111 may include, for example, a transmission gate realizing 64 ($2^6$) delay times by means of the demultiplexer according to the first control code of 6 bits. As described above, a maximum delay unit ('63·ΔPW delay in FIG. 4) of the fine delay unit 111 may be designed to cover delay steps of the coarse delay unit 112.

The coarse delay unit 112 may realize, for example, 32 ($2^5$) different delay times according to the second control codes VR0_con[0] to [31], and VRO_conb[0] to [31] of 5 bits. In FIG. 5, the coarse delay unit 112 is realized with stages 1121 formed of NAND gates being connected in a ladder structure, but this is just exemplary and may be realized to use different logic gates or have different structures.

Figure 6:
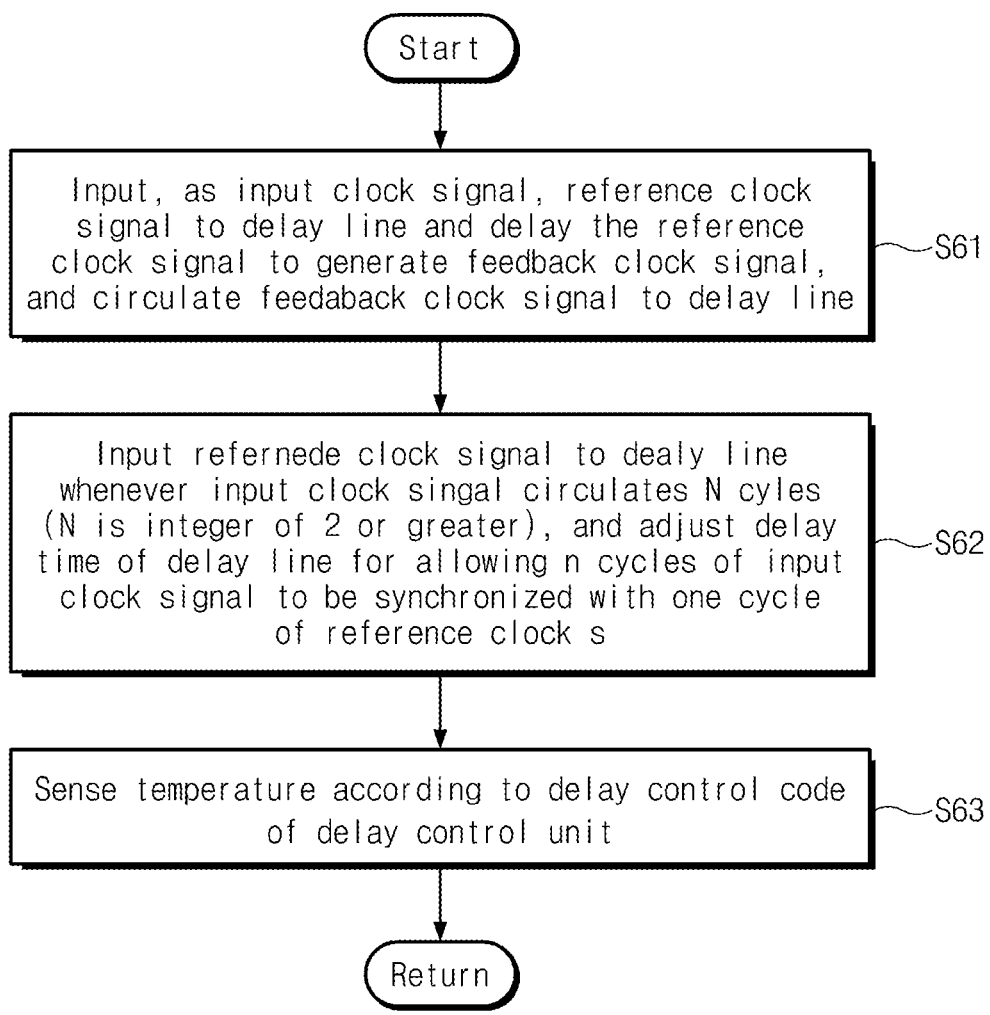
FIG. 6 is a flowchart illustrating a temperature sensing method according to an embodiment of the present invention.

FIG. 6 is a flow chart illustrating a temperature sensing method according to an embodiment of the present invention. In operation S61, the reference clock signal is input to the delay unit 110 as the input clock signal and is delayed to generate the feedback clock signal, and the feedback clock signal is circulated to the delay unit 110 only until when the input clock signal is circulated as many as the number of N cycles (where N is an integer of 2 or greater).

In operation S62, upon the input clock signal is circulated as many as the number of N cycles, the reference clock signal is input to the delay unit 110. At this time, the reference clock signal is input to the delay unit 110 from the time when the input clock signal is circulated as many as the number of N cycles to the time when a rising edge of the reference clock signal is input. The delay control unit 120 generates a delay control code to adjust the delay time of the delay unit 110 in order for N cycles of the input clock signal to be synchronized with one cycle of the reference clock signal. At this time, the delay control unit 120 adjusts the delay time whenever the input clock signal circulates as many as the number of N cycles.

The delay control unit 130 compares N cycles of the input clock signal with the reference clock signal to calculate 1-bit information for a delay control code at every (2 k−1)-th (where k=1, 2, . . . , K) cycle of an external clock signal according to the comparison result, and determines the K bit delay control code for adjusting the delay time of the delay unit 110 for 2K−1 cycles of the external clock signal.

The clock gate 140 clock-gates the external clock signal to generate the reference clock signal. The clock gate 140 may input a low level signal as the input clock signal at a 2 m (where m=1, 2, . . . , K−1)-th cycles of the external clock signal in order for the delay control unit 120 to determine the delay control code at a 2 k−1 (where k=1, 2, . . . , K)-th cycles. When one cycle of the reference clock signal is synchronized with N cycles of the input clock signal, the clock gate 140 may output, as the reference clock signal, the low level signal for predetermined clock cycle periods of the external clock signal in order to reduce power consumption.

Then, in operation S63, the temperature calculating unit 150 calculates temperature on the basis of a delay control code calculated at (2K−1)-th cycle of the external clock signal. The temperature calculating unit 150 compares the delay control code calculated in a sensing operation with a delay control code value calculated in a calibration process at reference temperature to measure current temperature. Each cycle of the reference clock signal is not affected by a quantization error or a jitter noise of a signal circulating in the ring oscillator RO in a previous cycle. Accordingly, the temperature sensing circuit 100 according to an embodiment of the present invention may exactly measure temperature by preventing a temperature measurement error from occurring due to accumulation of the quantization errors or the jitter noises.

Figure 7A:
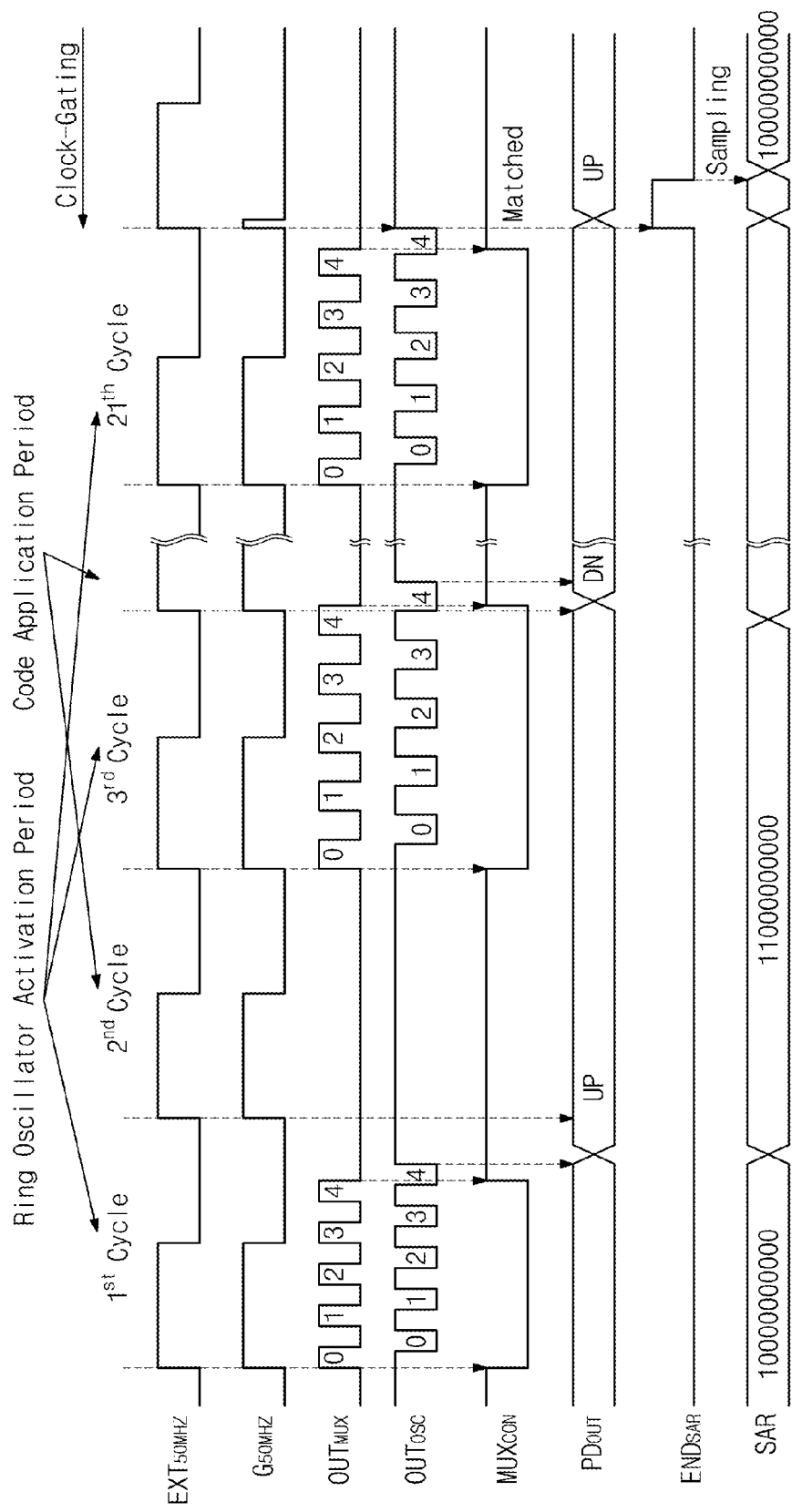
FIGS. 7A and 7B are timing diagrams of signals from a temperature sensing circuit according to an embodiment of the present invention.
Figure 7B:
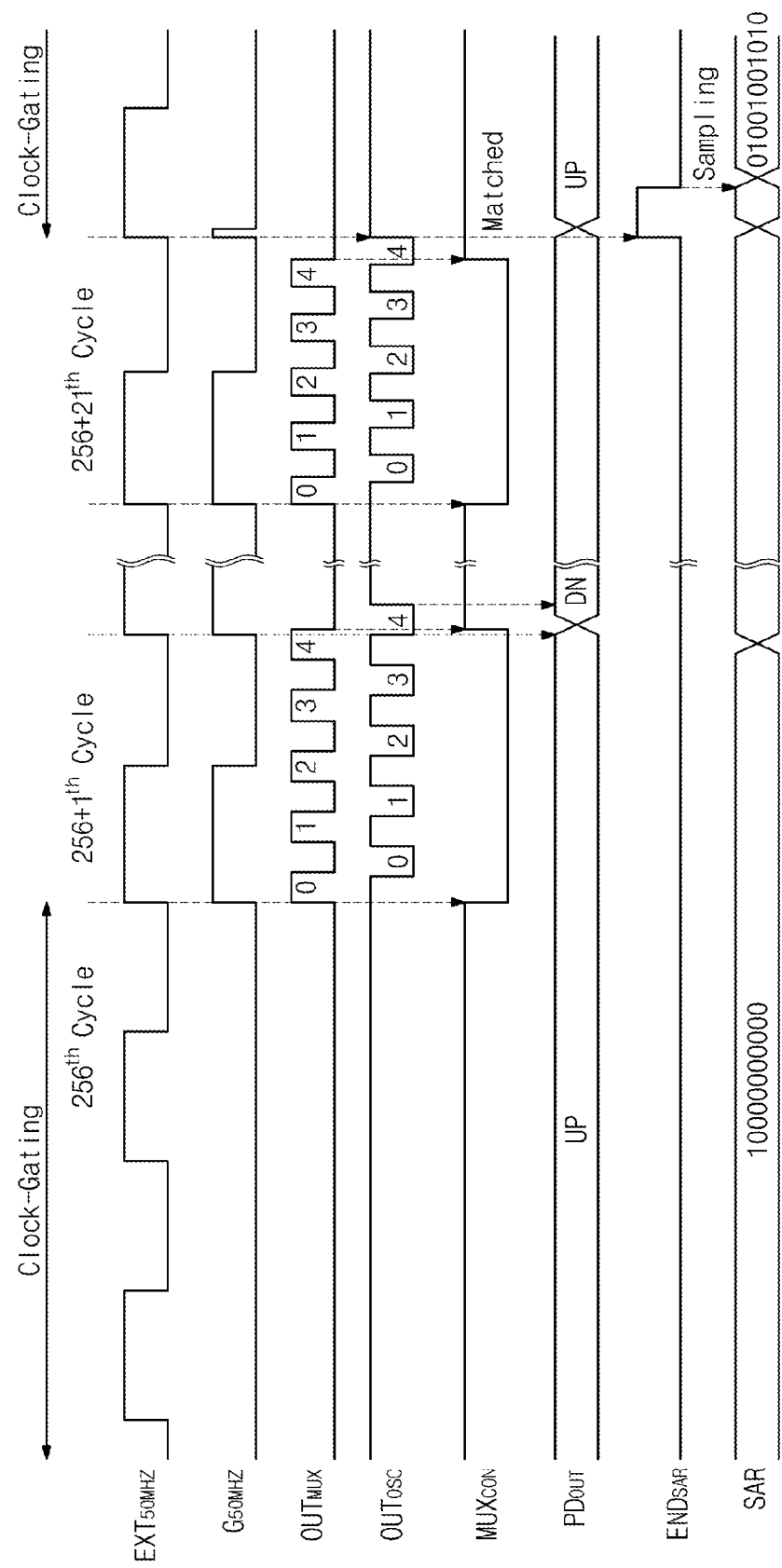

FIGS. 7A and 7B are timing diagrams of signals from the temperature sensing circuit according to an embodiment of the present invention. Referring to FIGS. 7A and 7B, a reference clock signal $G_{50\ MHz}$ is output which is synchronized with the external clock signal $EXT_{50\ MHz}$ from a first cycle to a 21st cycle from the external clock signal $EXT_{50\ MHz}$. Each even-numbered cycle of the external clock signal $EXT_{50\ MHz}$ is deactivated by being applied a separate code for application of a delay control code to every odd-numbered cycle. That is, the input signal control unit 130 inputs a low level signal (logically '0') to the delay unit 110 of the ring oscillator RO. Alternatively, the every even-numbered cycle of the external clock signal may also be possibly deactivated by using a separate controller (not shown) or the clock gate 140.

For every odd-numbered cycle of the external clock signal $EXT_{50\ MHz}$, 1-bit information for the delay control code is determined and a 11 bit delay control code is determined for 11 (1st, 3rd, . . . , 21st) cycles. At every odd-numbered cycle of the external clock signal $EXT_{50\ MHZ}$, a falling edge of a selection control signal $MUX_{CON}$ is generated in correspondence to a rising edge of the reference clock signal $G_{50\ MHz}$. That is, when the rising edge of the reference clock signal $G_{50\ MHz}$ is input, a first rising edge of the input clock signal $OUT_{MUX}$ is generated, and accordingly, the selection control signal $MUX_{CON}$ becomes a low level.

When selection control signal $MUX_{CON}$ becomes the low level, the feedback clock signal $OUT_{OSC}$ is input to the delay unit 110. Accordingly, the feedback clock signal $OUT_{OSC}$ is circulated in the ring oscillator RO. That is, the ring oscillator RO begins to oscillate.

In correspondence to 5 circulations of the input clock signal $OUT_{MUX}$, the rising edge of the selection control signal $MUX_{CON}$ is generated. That is, the counter 1312 counts falling edges of the input clock signal $OUT_{MUX}$, and, when the counted value reaches the designated number of cycles, namely, a reference value '5', the comparator 1313 generates a high level signal as the selection control signal $MUX_{CON}$.

When the selection control signal $MUX_{CON}$ becomes a high level, the reference clock signal $G_{50\ MHz}$ input to the delay unit 110. Accordingly, the ring oscillator RO in the temperature sensing circuit 100 stops resonation, and the temperature sensing circuit 100 is reset. The phase detecting unit 121 compares a fifth rising edge of the feedback clock signal $OUT_{OSC}$ with a rising edge of the reference clock signal $G_{50\ MHz}$. According to the comparison result, a delay control signal $PD_{OUT}$ of any one of UP and Down for a 1 bit of the delay control code is generated.

This procedure is repeated for 11 cycles among 21 cycles of the reference clock signal $G_{50\ MHz}$. When 1-bit information for the delay control code is obtained for every 2 cycles, an 11 bit delay control code is determined which corresponds to the number of the delay cells of the delay unit 110 at a $21^{st}$ cycle of the reference clock signal $G_{50\ MHz}$. A value of the delay control code generated by the delay control unit 120 at a $21^{st}$ cycle of the reference clock signal $G_{50\ MHz}$ is sampled for measuring temperature.

When the delay control code generation is completed for 21 cycles of the reference clock signal $G_{50\ MHz}$, the clock gating control signal $END_{SAR}$ becomes a high level and the delay control unit 120 applies the clock gating control signal $END_{SAR}$ to the clock gate 140. Accordingly, the clock gate 140 clock-gates the external clock signal $EXT_{50\ MHz}$ from a $22^{nd}$ cycle of the external clock signal $EXT_{50\ MHz}$ to output the reference clock signal $G_{50\ MHz}$ having a low level.

The clock-gating by the clock gate 140 is continued until a $256^{th}$ cycle according to information stored in the clock gate 140. That is, the clock gate 140 prevents power consumption by stopping unnecessary resonation of the ring oscillator after the operation of the delay control unit 120 is completed. The temperature measuring operation starts again from a $257^{th}$ cycle, this procedure is repeated, and temperature is measured in real time.

For sensing temperature, first, calibration of the temperature sensing circuit 100 is performed, and operations of sensing temperature and calibration may be performed identically. The temperature sensing circuit 100 may obtain the delay control code of the delay control unit 120 at different temperature from that of the calibration operation, compare the obtained delay control code with the delay control code obtained in the calibration operation to obtain the measured temperature.

According to an embodiment of the present invention, since the ring oscillator RO is reset every time the input clock signal circulates for N cycles in the ring oscillator RO of the temperature sensing circuit 100, the jitter noise and the quantization error are periodically reset to enhance accuracy of temperature measurement. Power consumption may be reduced by performing the clock-gating according to a temperature measurement period.

Figure 8:
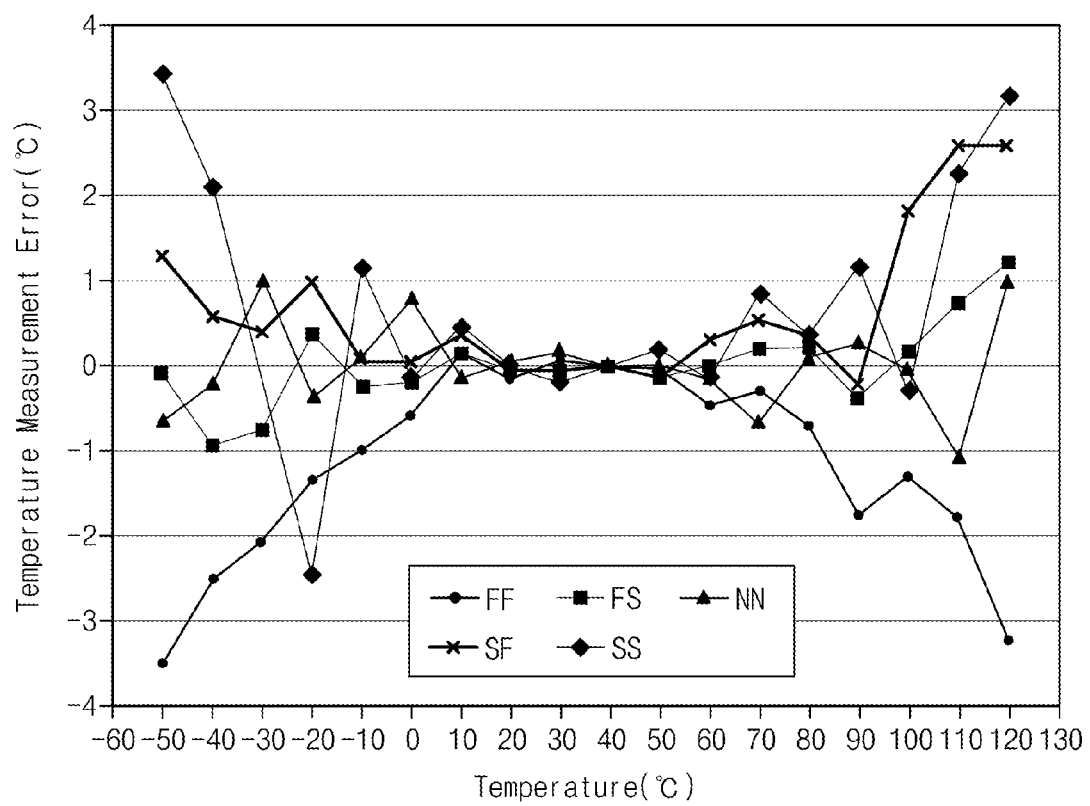
FIG. 8 is a graph illustrating a relationship of a temperature measurement error with respect to actual temperature of a temperature sensing circuit according to an embodiment of the present invention.
Figure 9:
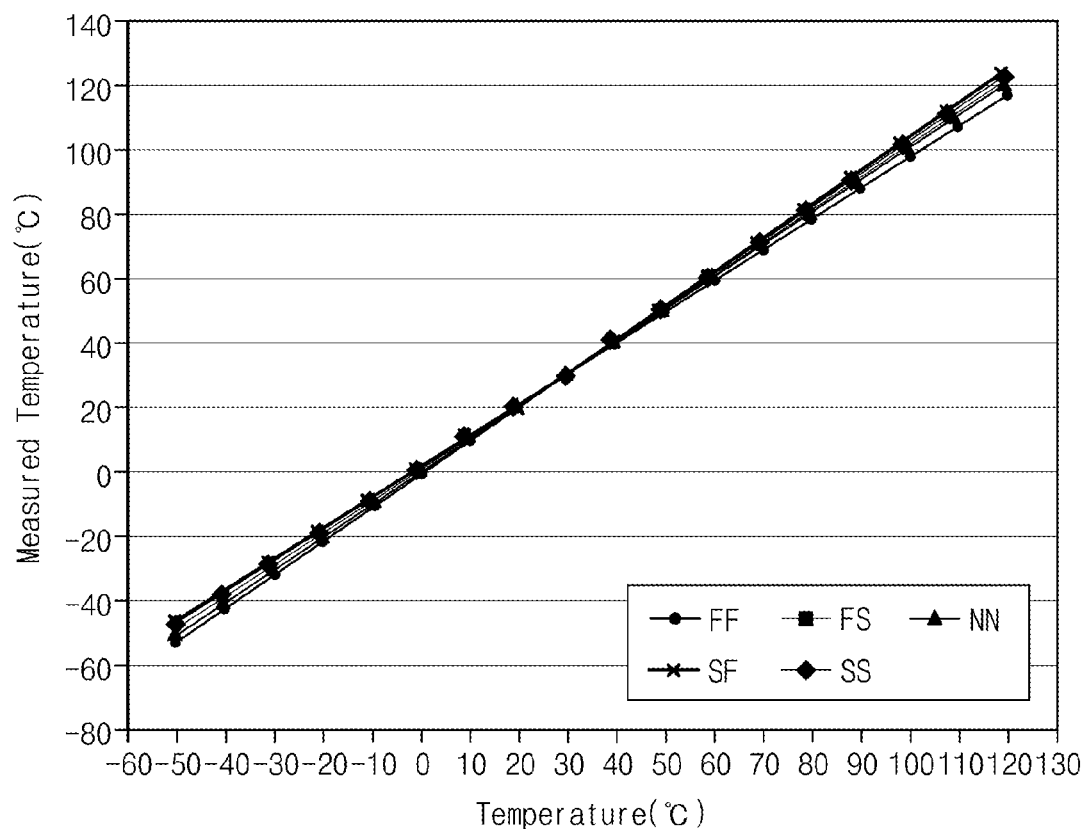
FIG. 9 is a graph illustrating a relationship of measured temperature with respect to actual temperature of a temperature sensing circuit according to an embodiment of the present invention.

FIG. 8 is a graph representing a temperature measurement error of a temperature sensing circuit according to an embodiment of the present invention. FIG. 9 is a graph representing temperature measured by the temperature sensing circuit according to an embodiment of the present invention. In FIGS. 8 and 9, 'FF' represents a case where an NMOS and PMOS of each logic gate of the delay unit 100 are all realized in a Fast type, 'FS' represents a case where they are respectively realized in Fast and Slow types, 'NN' represents a case where they are all realized in a Normal type, 'SF' represents a case where they are respectively realized in Slow and Fast types, and 'SS' represents a case where they are all realized in a Slow type. From FIGS. 8 and 9, it may be known that, although the NMOS and PMOS are realized in any type, the measured temperature by the temperature sensing circuit according to an embodiment of the present invention relatively accurately follows actual temperate within a range of −10 to 80° C., and a temperature measurement error appears within 1° C.

According to embodiments of the present invention, a temperature measurement error can be reduced.

In addition, according to embodiments of the present invention, in a digital temperature sensing circuit of a ring oscillator structure, accumulation of noises, such as quantization errors or jitters, can be prevented.

Furthermore, according to the embodiments of the present invention, power consumption in a temperature measuring circuit can be reduced.

The effects in the present invention are limited thereto. The effects not mentioned in the above should be clearly understood by those skilled in the art from the specification and the accompanying drawings.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A temperature sensing circuit comprising:
a delay unit configured to delay an input clock signal to generate a feedback clock signal, the delay unit including logic gates;
a delay control unit configured to control each of the logic gates of the delay unit by comparing the feedback clock signal with a reference clock signal; and
an input signal control unit configured to select, as the input clock signal, one of the feedback clock signal and the reference clock signal to input to the delay unit, based on a number of circulation cycles of the input clock signal.

2. The temperature sensing circuit of claim 1, wherein the input signal control unit is configured to input the feedback clock signal to the delay unit only while the input clock signal circulates as many as a set number of cycles, and input the reference clock signal to the delay unit after the input clock signal circulates as many as the set number of cycles.

3. The temperature sensing circuit of claim 2, wherein, the input signal control unit, after receiving rising edges of the reference clock signal, is configured to input the feedback clock signal to the delay unit.

4. The temperature sensing circuit of claim 1, wherein the delay control unit is configured to control each of the logic gates every time the input clock signal circulates as many as the set number of cycles.

5. The temperature sensing circuit of claim 1, wherein the delay control unit is configured to control the delay unit so that N cycles (where N is an integer of 2 or greater) of the input clock signal are synchronized with one cycle of the reference clock signal.

6. The temperature sensing circuit of claim 1, wherein the input signal control unit comprises:
a selection signal generating unit configured to generate a selection control signal according to the number of circulation cycles of the input clock signal; and
a multiplexer configured to select, as the input clock signal, one of the feedback clock signal and the reference clock signal according to the selection control signal and input the input clock signal to the delay unit.

7. The temperature sensing circuit of claim 6, wherein the selection signal generating unit comprises:
a counter configured to count pulses of the feedback clock signal; and
a comparator configured to compare the count result of the counter and a reference value, and to generate the selection control signal according to the comparison result.

8. The temperature sensing circuit of claim 7, wherein
the comparator is configured to reset the counter to have an initial value after the input clock signal circulates as many as the set number of cycles, and
the counter is configured to count the pulses of the feedback clock signal from when the feedback clock signal is input to the delay unit in correspondence to rising edges of the reference clock signal.

9. The temperature sensing circuit of claim 1, further comprising:
a clock gate configured to clock-gate an external clock signal to generate the reference clock signal.

10. The temperature sensing circuit of claim 9, wherein, after one cycle of the reference clock signal is synchronized with N cycles of the input clock signal, the clock gate is configured to output a low level signal as the reference clock signal for a clock cycle period of the external clock signal.

11. The temperature sensing circuit of claim 1, further comprising:
a temperature calculating unit configured to calculate temperature on the basis of a control code for each of the logic gates controlled by the delay control unit.

12. A temperature sensing method comprising:
inputting, as an input clock signal, a reference clock signal to a delay unit;
delaying the reference clock signal to generate a feedback clock signal;
circulating the feedback clock signal to the delay unit only while the input clock signal circulates as many as N cycles (where N is an integer of 2 or greater);
after the input clock signal circulates as many as N cycles, inputting the reference clock signal to the delay unit; and
adjusting a delay time of the delay unit to allow N cycles of the input clock signal to be synchronized with one cycle of the reference clock signal.

13. The temperature sensing method of claim 12, wherein the adjusting of the delay time comprises:
   inputting the reference clock signal to the delay unit from when the input clock signal circulates as many as N cycles to when rising edges of the reference clock signal are input.

14. The temperature sensing method of claim 12, wherein the adjusting of the delay time comprises:
   adjusting the delay time every time the input clock signal circulates as many as the number of N cycles.

15. The temperature sensing method of claim 12, further comprising:
   clock-gating an external clock signal to generate the reference clock signal; and
   outputting, as the reference clock signal, a low level signal for a clock cycle period of the external clock signal, after one cycle of the reference clock signal is synchronized with N cycles of the input clock signal.

16. The temperature sensing method of claim 12, wherein the adjusting of the delay time comprises:
   comparing N cycles of the input clock signal with one cycle of the reference clock signal;
   calculating one-bit information for a delay control code, which controls logic gates of the delay unit at every $(2k-1)$-th (where $k=1, 2, \ldots, K$) cycle of an external clock signal according to the comparison result; and
   determining a K-bit delay control code for adjusting the delay time of the delay unit for $2K-1$ cycles of the external clock signal.

17. The temperature sensing method of claim 16, wherein the adjusting of the delay time comprises:
   inputting, as the input clock signal, a low level signal at a $2m$-th (where $m=1, 2, \ldots, K-1$) cycle of the external clock signal for determining the delay control code at the $(2k-1)$-th (where $k=1, 2, \ldots, K$) cycle of the external clock signal.

18. The temperature sensing method of claim 16, further comprising:
   calculating temperature on the basis of the K-bit delay control code.

* * * * *